July 22, 1941.    J. R. PARKINGTON    2,250,233

STORAGE CELL WITH RADIAL PLATES

Filed Sept. 11, 1939

INVENTOR
J. R. PARKINGTON
By Wilkinson & Groff Attys

Patented July 22, 1941

2,250,233

UNITED STATES PATENT OFFICE 2,250,233

STORAGE CELL WITH RADIAL PLATES

John Roger Parkington, Newcastle-Emlyn, South Wales

Application September 11, 1939, Serial No. 294,390
In Great Britain September 20, 1938

5 Claims. (Cl. 136—6)

This invention relates to electrical storage batteries, secondary cells or accumulators, and has for its object to provide an improved construction which will enable approximately balanced and equal chemical and electrical action to be obtained, so as to utilize to the best advantage the interacting ingredients of the cell. The improved construction according to this invention also aims at securing a "balanced" capacity and equalization of the mechanical and electrical stresses set up in the cell, particularly during the process of charging, thereby obtaining an efficiency greater than that of existing batteries of similar external dimensions.

Hitherto it has been the general practice to dispose the positive and negative plates of a storage battery in parallel formation, with the result that the whole of one side of two plates takes very little part in the operation of the cell, either during charging or discharging, and although proposals have been made heretofore involving the use of plates other than in parallel formation, these prior proposals have had attendant disadvantages which the present invention seeks to overcome.

For convenience, the term "secondary cell" only will be employed in the following description and claims, and should be read as equivalent to the terms "storage battery" and "accumulator."

Broadly, the present invention provides a secondary cell characterized in that the positive and negative electrodes, of which alternate ones at least are of plate form, are disposed in other than parallel formation in such a manner that both sides of each plate-like electrode are equally reactive with their complementary electrodes.

In carrying the invention into effect, it is preferred to employ positive and negative plates disposed alternately and in radial or diagonal formation with a vessel of square, rectangular or other convenient shape, so that the adjacent faces of the alternate positive and negative plates or portions of plates are inclined to one another. Interposed between these adjacent inclined faces of plates or plate portions of opposite polarity are insulating screens or barriers which emanate from the junctions between said faces and project out therefrom at positions at substantially equal angles from the adjacent inclined faces, so as to prevent the electrolyte effecting chemical and electrical reaction between the close-together portions of plate surfaces of opposite polarity (near the junctions between such plates) at a rate much in excess of that between the more remotely situated portions of the plates.

The above described preferred arrangement is not to be considered as embracing all the possible constructions of the invention, and several other forms will be described later.

In the accompanying drawing which illustrates some embodiments of the invention:

Figure 1:
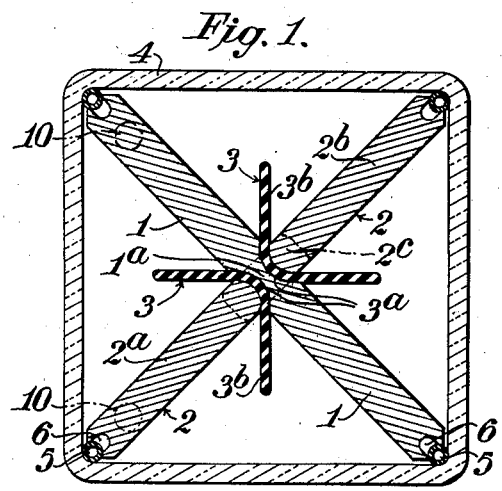
Figure 1 is a sectional plan of the simplest and preferred embodiment.
Figure 2:
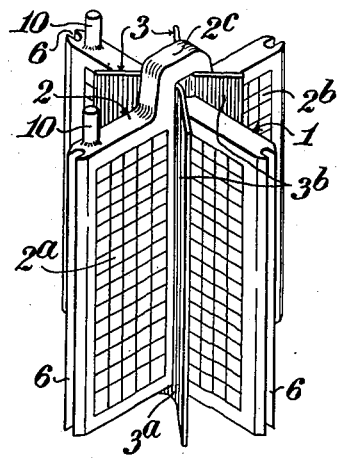
Figure 2 is a pictorial view of the plate assembly.

In the preferred arrangement shown in Figures 1 and 2, two plates only are employed, a positive plate 1 and a negative plate 2, one of which, for example, plate 2, is divided into two sections or halves 2a, 2b, which are connected by a link or bridge-piece 2c so as to sit saddle-wise over the other and undivided plate 1. The two plates 1, 2 are disposed at right angles to one another and between the mutually perpendicular faces of opposite polarity are interposed the insulating members 3 which are each conveniently made in the form of an L or angle-section strip of ebonite or the like, the root 3a of the angle strip, i. e. the junction between two walls 3b thereof, being disposed in contact with the centre of length of the undivided plate 1 and behind the inner edge of the appropriate section or half (2a or 2b) of the divided plate. The walls 3b of the two L or angle strip insulators 3 project out in fin-like fashion between the adjacent inclined faces of the two plates approximately half-way toward the sides of the electrolyte vessel or container 4, which is square or rectangular in plan and in which the two plates 1, 2 in their X-formation are diagonally disposed. The undivided plate 1 is preferably thinned in the middle, i. e. at 1a, where the other plate 2 is located, leaving only metal sufficient for the required strength and conductivity of the plate frame or skeleton.

Strips of rubber tube 5 or the equivalent are placed between the vertical edges of the plates 1, 2 and the corners of the vessel 4 to act as cushions for shock absorption and to allow for inequalities in and/or expansion of the plates, grooves 6 being provided in the plate edges to locate said tubes 5.

Figure 3:
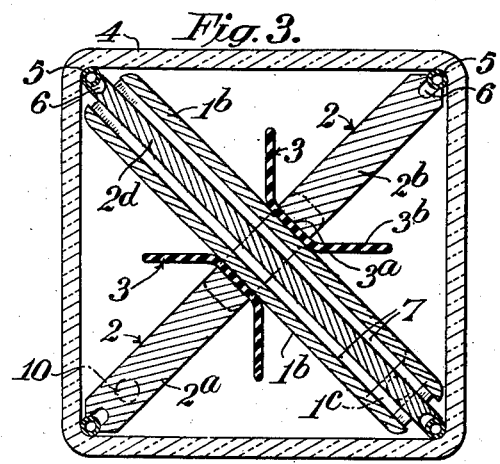
Figures 3 and 4 are views similar to Figures 1 and 2 and show a modification thereof.
Figure 4:
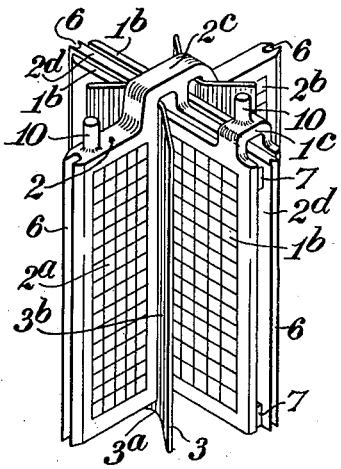

In the modified construction shown in Figures 3 and 4, the single plate 1 is dispensed with and is replaced by an assembly of three plates in parallel formation, the two outer plates 1b, which are connected by a link or bridge-piece 1c, being of opposite polarity to that of the two-part plate 2, whilst the inner plate 2d is of the same polarity as plate 2. The plates 1b and 2d are held in spaced relation by separating strips 7 of wood or other non-conducting material.

Figure 5:
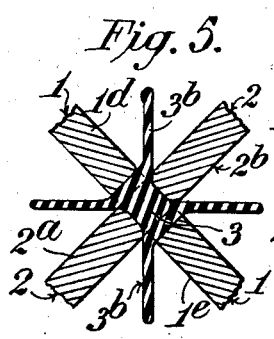
Figure 5 is a fragmentary view showing the use of two plate electrodes each constituted of two sections or halves with a common insulator; and, Figures 6, 7 and 8 illustrate diagrammatically some of the various ways in which the electrodes may be arranged according to this invention, as hereinafter more particularly described.

Figure 5 illustrates a further modification, in which both plates 1, 2 are each constituted by two interconnected sections or halves 1d, 1e and 2a, 2b respectively, the four sections or halves being separated by a common insulating member 3, having the appropriate number of fins or walls 3b. The fins or walls 3b are situated at equal inclination to the faces of the four plate sections and the said sections and their insulating fins may be radially disposed, as shown, or arranged tangentially relative to a common base circle. This mode of construction is applicable to the parallel-plate modification illustrated in Figures 3 and 4. The insulator 3 extends a suitable distance above and below the plates which it separates.

Figure 6:
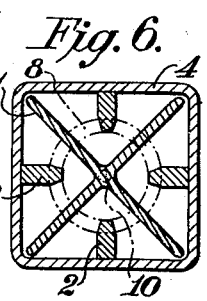
Figure 7:
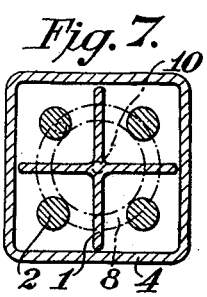
Figure 8:
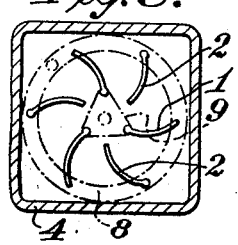

The diagrammatic Figures 6 to 8 illustrate some of the various ways in which the invention can be carried into effect, the forms illustrated in Figures 6 and 7 differing from those already described mainly in that half of the electrodes, that is, alternate electrodes, either of positive or negative polarity, are of plate form, indicated by numeral 1, and radiate from a common centre, being made for preference as a unitary article. These plate electrodes 1 may be arranged diagonally within the vessel 4, that is, extending into the corners thereof, as in Figure 6, or arranged radially or perpendicular to the walls of a square vessel as in Figure 7. The remaining electrodes 2 may be of plate form, as in Figure 6, or of rod form as in Figure 7, and are interconnected by a ring-like link or bridge 8.

In the arrangement illustrated in Figure 8, all electrodes are radially disposed and of plate form, either curved, as shown, or straight, the alternate plates 1, 2 of opposite polarity being connected by links or bridges 9, 8 respectively. If desired, the plates may extend inwards and form a unitary member, thereby dispensing with the link 9. In all the figures of the accompanying drawing, the usual plate terminal posts are indicated by numeral 10.

I claim:

1. In a storage cell, a pair of respectively positive and negative electrode plates mounted in substantially perpendicular mutually insulatingly intersecting relation, and a plurality of insulating baffle plates extending interstitially radially a substantial distance from the intersection of said electrode plates respectively substantially medially therebetween.

2. A storage cell according to claim 1, said baffle plates being formed as an integral unit.

3. In a storage cell, a pair of respectively positive and negative electrode plates mounted in substantially perpendicular mutually insulatingly intersecting relation, and a pair of insulating right-angle baffle elements each having its apex fitted in the intersection of said electrode plates and having equal legs constituting baffle plates which extend interstitially radially a substantial distance from the intersection of said electrode plates respectively substantially medially therebetween.

4. A storage cell according to claim 3, said pair of baffle elements being formed integrally as a single unit.

5. In a storage cell, a substantially square vessel, a pair of respectively positive and negative electrode plates mounted in substantially perpendicular mutually insulatingly intersecting relation and extending into the corners of said vessel, a plurality of insulating baffle plates extending interstitially radially a substantial distance from the intersection of said electrode plates respectively substantially medially therebetween, and resilient means carried on the outer edges of said electrode plates and engaging the corners of said vessel for holding said electrode plates tightly therein.

JOHN ROGER PARKINGTON.